(12) United States Patent
Collart

(10) Patent No.: US 10,430,891 B2
(45) Date of Patent: Oct. 1, 2019

(54) ACCOUNT MANAGEMENT SYSTEM AND METHOD

(71) Applicant: TracFone Wireless, Inc., Miami, FL (US)

(72) Inventor: Daniel Collart, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 734 days.

(21) Appl. No.: 14/819,937

(22) Filed: Aug. 6, 2015

(65) Prior Publication Data

US 2016/0042329 A1 Feb. 11, 2016

Related U.S. Application Data

(60) Provisional application No. 62/033,942, filed on Aug. 6, 2014.

(51) Int. Cl.
*G06Q 40/00* (2012.01)
(52) U.S. Cl.
CPC ..................... *G06Q 40/12* (2013.12)
(58) Field of Classification Search
CPC ......... G06Q 20/08; G06Q 20/10; G06Q 40/12
USPC .............................. 705/34, 40, 42
See application file for complete search history.

(56) References Cited

U.S. PATENT DOCUMENTS

| | | | | |
|---|---|---|---|---|
| 2004/0111370 A1* | 6/2004 | Saylors | .................. | G06Q 20/10 705/40 |
| 2004/0215560 A1* | 10/2004 | Amalraj | ................. | G06Q 20/04 705/40 |
| 2005/0075975 A1* | 4/2005 | Rosner | .................. | G06Q 20/04 705/40 |
| 2005/0117566 A1 | 6/2005 | Davidson | | |
| 2006/0116892 A1* | 6/2006 | Grimes | .................. | G06Q 10/02 705/5 |
| 2006/0212392 A1* | 9/2006 | Brown | .................. | G06Q 20/10 705/40 |
| 2006/0212393 A1* | 9/2006 | Lindsay Brown | ..... | G06Q 20/10 705/40 |
| 2008/0215472 A1* | 9/2008 | Brown | .................. | G06Q 20/10 705/35 |
| 2008/0270304 A1* | 10/2008 | Brown | .................. | G06Q 20/10 705/44 |
| 2009/0081989 A1* | 3/2009 | Wuhrer | .................. | G06Q 20/10 455/406 |
| 2010/0161486 A1* | 6/2010 | Liu | ........................ | G06Q 20/10 705/41 |
| 2011/0288967 A1* | 11/2011 | Selfridge | ............... | G06Q 20/00 705/30 |
| 2012/0136780 A1* | 5/2012 | El-Awady | ............ | G06Q 20/102 705/40 |

(Continued)

*Primary Examiner* — Oluseye Iwarere
(74) *Attorney, Agent, or Firm* — BakerHostetler

(57) ABSTRACT

A fund allocation management system and method of managing prepaid debit cards that allows customers to allocate funds to pay monthly bills, reoccurring expenses, or save for special purchases. More specifically, this fund allocation management system optionally calculates monthly expenses and allows customers to set certain funds aside for known expenses. Examples of customers that may benefit from this type of card and/or service includes customers using traditional bank cards as well as customers who may not qualify for traditional bank accounts. The customers can deposit funds into the prepaid cards and use it for general expenses.

20 Claims, 5 Drawing Sheets

(56) References Cited

U.S. PATENT DOCUMENTS

| | | | |
|---|---|---|---|
| 2012/0239417 A1* | 9/2012 | Pourfallah | G06Q 50/22 |
| | | | 705/2 |
| 2013/0103580 A1* | 4/2013 | Ventura | G06Q 40/02 |
| | | | 705/40 |
| 2014/0012745 A1* | 1/2014 | Hanson | G06Q 20/102 |
| | | | 705/40 |
| 2014/0012746 A1* | 1/2014 | Hanson | G06Q 40/00 |
| | | | 705/40 |
| 2014/0180919 A1* | 6/2014 | Brown | G06Q 20/1085 |
| | | | 705/42 |

* cited by examiner

ACCOUNT MANAGEMENT SYSTEM AND METHOD

CROSS REFERENCE TO PRIOR APPLICATIONS

This application claims the benefit from U.S. Provisional Application No. 62/033,942 filed on Aug. 6, 2014, which is hereby incorporated by reference for all purposes as if fully set forth herein.

FIELD OF THE INVENTION

The invention generally relates to an account management system. More particularly, the invention pertains to an account management system for bank accounts and/or prepaid debit cards and a method of managing funds associated with the bank accounts and/or prepaid debit cards.

BACKGROUND OF THE INVENTION

Customers often purchase goods for sale using commerce cards such as credit, electronic funds transfer (EFT), debit cards and the like. Debit cards in particular allow customers to have a greater control over the money spent because, in general, the consumer cannot exceed the funds allocated to the card. A benefit of prepaid debit cards is that they reduce the opportunity to acquire debt.

In addition to goods purchased in stores, debit cards can be used to pay bills such as, utility bills, cable bills, medical bills, etc. However, using conventional debit cards to pay bills may result in the bill not being paid and/or ultimately increase the consumer's debt. For example, if insufficient funds are allocated to the debit card and/or funds allocated to the debit card are not properly accounted for when making purchases with the debit card, insufficient funds on the card can result in the bill not being paid in a timely manner. This may occur with EFT and other payment approaches as well. Unfortunately, late payment typically results in fines which can increase the consumer's debt.

Accordingly, it is desirable to provide a system for managing bank accounts and/or debit cards and method of managing the bank accounts and/or debit cards that is capable of overcoming the disadvantages described herein at least to some extent.

SUMMARY OF THE INVENTION

The foregoing needs are met, at least to a great extent, by the invention, wherein in one respect a prepaid debit card and a method of managing the prepaid debit card account is provided that in some aspects allocates predetermined funds to pay reoccurring or upcoming expenditures.

An aspect of the invention pertains to a method of managing a debit card account. In this method, an account is established and may be linked to the debit card or other type of payment functionality. Funds are allocated from the account to pay a selected bill that is due in the future. The allocated funds are prevented from being withdrawn from the account to pay for anything except the selected bill.

Another aspect of the invention relates to a debit card system. The debit card system includes a debit card, an account linked to the debit card, and a processor configured to access the account. The processor is further configured to allocate funds from the account to pay a selected bill that is due in the future and prevent the allocated funds from being withdrawn from the account to pay for anything except the selected bill.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION OF THE INVENTION

An aspect of the invention includes a fund allocation management system and method of managing a suitable banking account and/or prepaid debit cards. More specifically, this fund allocation management system optionally calculates monthly expenses and allows customers to set certain funds aside for known expenses. In this manner, customers are provided the ability to forecast if and when they might run out of money by looking at the future bills to pay (exact recurring amounts or estimated bills) and future frequency of cash deposits/loads (direct deposits or cash loans). Examples of customers that may benefit from this type of banking account, card and/or service includes customers using traditional bank accounts and cards as well as customers who may not qualify for traditional bank accounts. The customers can deposit funds into the suitable bank account and/or prepaid cards and use it for general expenses. Examples of suitable bank accounts include savings accounts, checking accounts, stored value accounts, and the like.

In addition, customers may activate a fund allocation management service that informs them regarding an amount of discretionary funds they have available based on their own settings and/or through automated algorithms that calculate monthly and/or other reoccurring expenses. Described in a different way, the fund allocation management service operates as a form of escrow to lay funds aside for non-discretionary expenses such as electric bills, water bills, car payments, and so forth. The fund allocation management service optionally determines additional costs for late payments so that the customer can make an informed decision as to which bills to pay on time and, if need be, and which can be late.

The fund allocation management system optionally includes a password to protect funds so that selected funds may be locked into payment for selected bills. In this manner, these preselected bills are paid and remaining funds may be calculated by subtracting the protected funds from the total funds. The customers may be provided with a tally of these remaining funds in order to determine how much discretionary funds they have at any given period.

The fund allocation management system may be configured to adjust based on the customer's behavior and/or account for seasonal changes (e.g. gas is typically more expensive during the winter and electricity generally costs more during the summer). Optionally, funds may be allocated to a reserve for a particular item and/or classes of items. For example, a reserve may be created by setting aside funds for a television or other relatively expensive single item. In another example, funds may be allocated to a reserve for diapers, food, clothing, and the like. In response to these selected items or classes of items being purchased with funds from the banking account or the prepaid debit card, the allocated funds may be automatically withdrawn or manually withdrawn by the customer.

Figure 1:
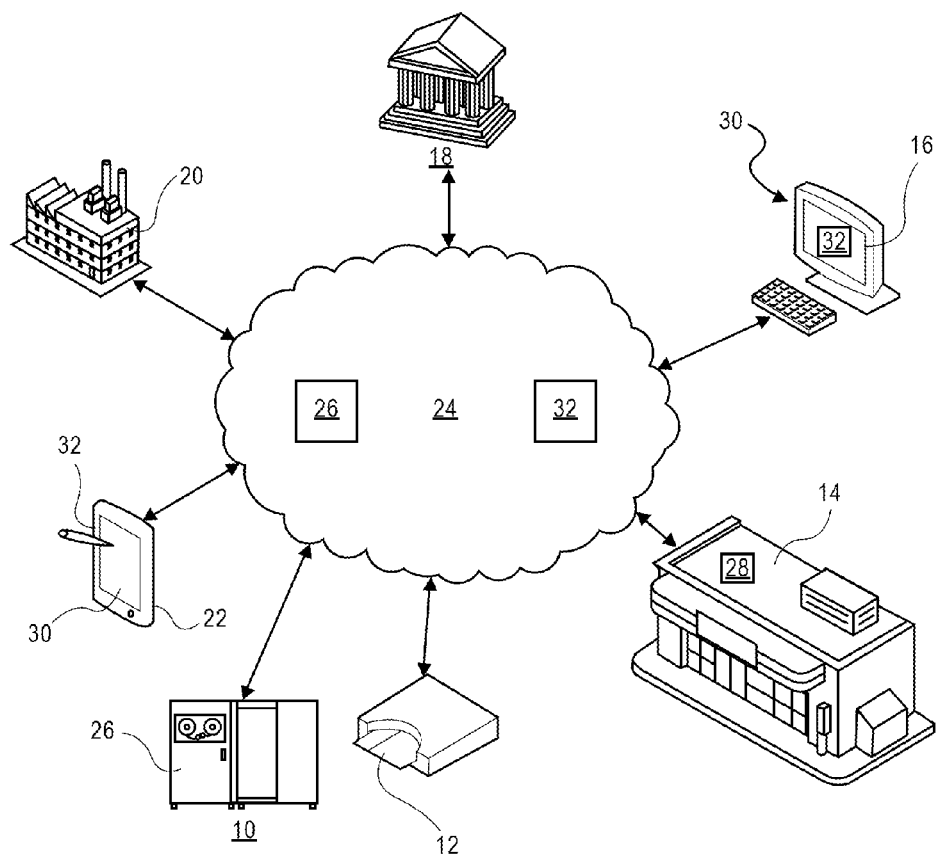
FIG. 1 is a block diagram of a fund allocation management system and entities interacting therewith according to an aspect of the invention.

In the following description, particular example is made of a prepaid or debit card. However, in other examples, the debit card may be tied to and therefore facilitate movement of funds to and from a banking account such as a general savings account, checking account, stored value account and/or the like. In this regard, any type of payment method may be utilized. However, for brevity the description will reference a debit card implementation. An aspect of the invention will now be described with reference to the drawing figures, in which like reference numerals refer to like parts throughout. As shown in FIG. 1, a fund allocation management system 10 may include or interact with a debit card 12, a point of sale 14, a work station 16, a bank 18, a utility 20, a wireless device 22 and a network 24. The various components of the fund allocation management system 10 are configured to intercommunicate and the fund allocation management system 10 may include any other suitable device and/or institution. It should be noted that reference to bank 18 is meant to be generic. The bank 18 can be any financial institution or similar operation that can maintain funds for a customer.

The debit card 12 is configured to provide the customer with the ability to purchase any suitable goods and/or services. In general, the debit card 12 can be used in the same manner as any conventional consumer purchasing card. Due to the debit-nature of the card, purchases made are subtracted from a balance retained in an account 26 that is associated with the debit card 12. In addition or alternatively, the debit card 12 may include a smart card that includes a processor with memory and the account 26 may be stored in this memory. The balance on the account 26 and/or how the funds in the account 26 are to be allocated may be administered in any suitable manner. For example, a salary of the customer may be directly deposited into the account 26. In another example, the customer may administer the account 26 remotely from the work station 16 and/or wireless device 22 and funds may be transferred to the account 26 from another account. In this example, the customer may log into the account and transfer funds from another account the customer has access to. While the customer is logged in, the customer may utilize a user interface to allocate funds. In yet another example, the customer may administer the account at the bank 18 and/or point of sale 14 using cash, check, or another customer card. In this example, the customer may provide a teller or salesperson with money and the teller or salesperson may then deposit some or all of the funds to the account 26. The customer may allocate funds within the account 26 via a user interface provided by the point of sale 14 or bank 18 or the customer may instruct the teller or salesperson to allocate funds, for example.

The point of sale 14 is a store or other such place or business, online store, virtual store, or the like. In general, the point of sale 14 may sell the debit card 12 to the customer. In a particular example, the point of sale 14 may include a kiosk 28 to purchase the debit card 12 and/or manage the account 26. In another example, the debit card 12 is purchased from the salesperson. In yet another example, a form may be filled out or the customer may register online and the debit card 12 may be mailed to the customer. Other methods to obtain a debit card are contemplated as well. In addition to the debit card 12, the point of sale 14 may include other items for sale. For example, the point of sale 14 may be a convenience-type store, department store, grocery store, hardware store, electronics store, check cashing business, or the like.

The work station 16 is configured to access the account 26 via the network 24. As described in greater detail herein, the work station 16 may be configured to facilitate setting up, purchasing or obtaining the debit card 12, managing the account 26, and/or using the debit card 12 to purchase goods and services over the network 24 or Internet, for example. Generally, the work station 16 includes a computer 30 configured to execute instructions of a financial management application 32 to allow the customer to enter instructions, execute commands in response to the instructions, and display information to the customer.

The bank 18 is configured to provide general banking services to the customer. In addition, the bank 18 may be configured to maintain the funds in the account 26, transfer funds to and/or from the account 26, and/or manage allocations within the account 26 for the customer. The bank 18 may also issue the debit card 12. For example, the bank 18 may include a kiosk, computer terminal, automated teller machine (ATM) or a teller that can manage the allocations according to the instruction of the customer.

The utility 20 is configured to provide a service to the customer such as, for example, electricity, gas, cable television, internet services, telephone services, and the like. Bills from the utility 20 may be paid using the debit card 12. For example, a physical bill mailed to the customer may include an option to pay all or part of the bill with a consumer card such as the debit card. In another example, the utility 20 may maintain a Web page where the customer may log in to access and manage their utility account. The Web page may include an option for paying by consumer card such as the debit card 12. In one example, the utility 20 simply accepts payment without providing other information. In another example, the utility 20 is configured to intercommunicate with the account 26. In this example, the utility 20 may provide the account 26 or a computer application managing the account 26 with an actual or estimated billing amount for one or more future bills. With this information, the funds allocated for bills from the utility 20 may be automatically managed without input from the customer.

The wireless device 22 may include the computer 30 configured to execute instructions of a financial management application 32 to allow the customer to enter instructions, execute commands in response to the instructions, and display information to the customer. In general, execution of the financial management application 32 provides the customer with the ability to manage the account 26. In addition, the wireless device 22 may include one or more communication interfaces to allow the customer to pay bills directly with the wireless device 22. Examples of a communication interface include a modem, a network interface (such as an Ethernet card), a communications port, wireless transmitter and receiver, BLUETOOTH®, near field communication (NFC), Wi-Fi, infra-red, cellular, satellite, a Personal Computer Memory Card International Association (PCMCIA) slot and card, a communication channel as defined herein, or the like.

The network 24 is configured to facilitate intercommunication between the various other elements of the fund allocation management system 10. In addition, the network 24 may be configured to execute the financial management application 32 to manage the account 26. In this regard, the network 24 may include a cloud computing and/or storage capability.

Figure 2:
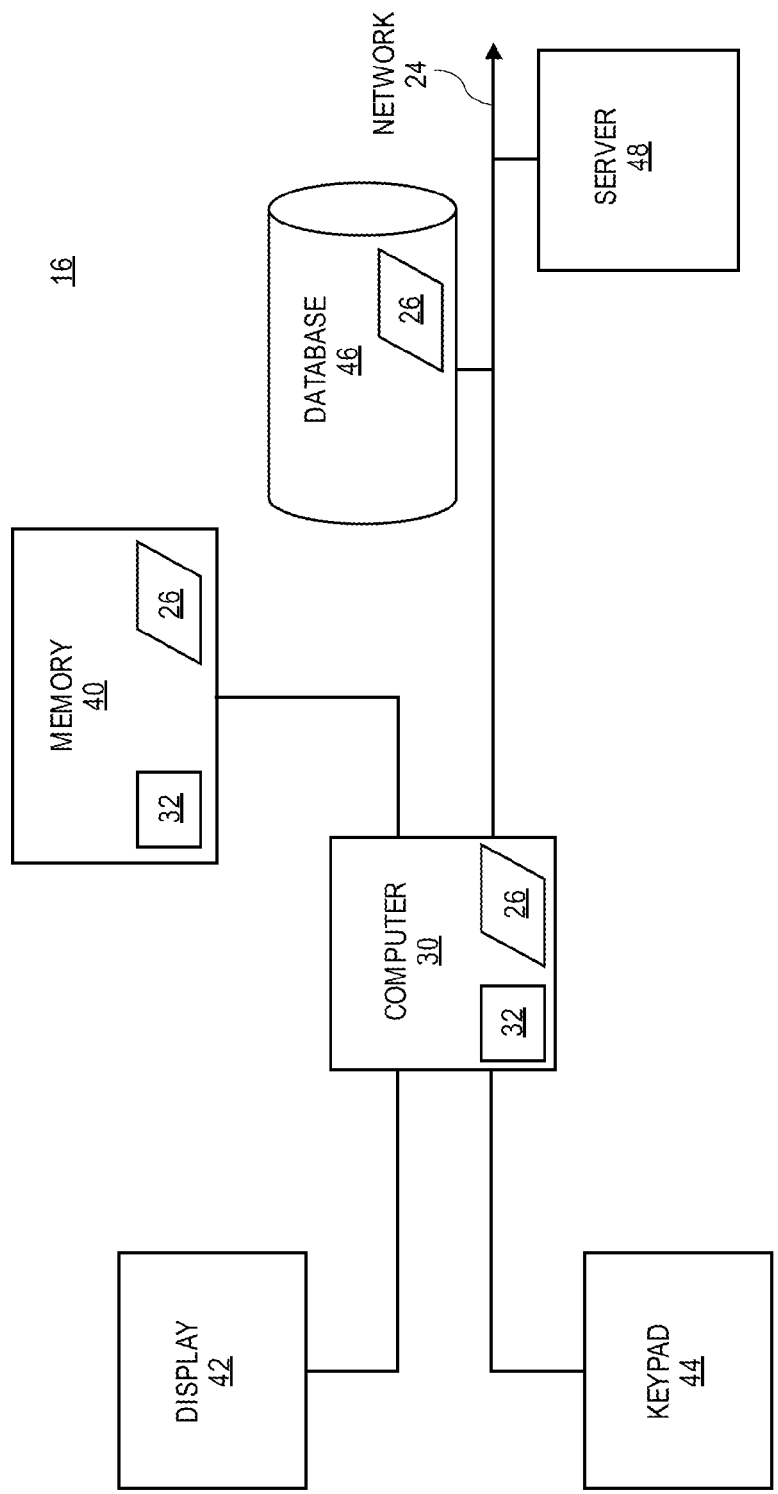
FIG. 2 is a block diagram of a work station suitable for use with the fund allocation management system according to FIG. 1.

FIG. 2 is a system architecture for the fund allocation management system 10 according to an aspect of the invention. As shown in FIG. 2, the computer 30 is configured to intercommunicate with a memory 40, a display 42, and a customer input device such as, for example, a keypad 44. The memory 40 is configured to store data received from the computer 30. For example, the memory 40 may store information pertaining to the account 26, the financial management application 32, and the like. The computer 30 may be configured to access the financial management application 32 and execute the instructions therein in order to manage the account 26. The display 42 is configured to provide visual information to the customer. In another form, the display 42 may include a touch screen configured to provide a data entry capacity to the customer.

Furthermore, in various aspects of the invention, the fund allocation management system 10 may include or interact with the network 24 configured to intercommunicate with the computer 30. The network 24 may include, for example, a database 46, a server 48, and a multitude of other networked devices. In this regard, the network 24 may include a local area network (LAN), wide area network (WAN), wireless network, the Internet, a communication channel as defined herein, and the like. In addition, the account 26 may be accessed by one or more customers. For example, several members of the same family or other trusted persons or agents may have access to the account via the various components of the fund allocation management system 10.

Figure 3:
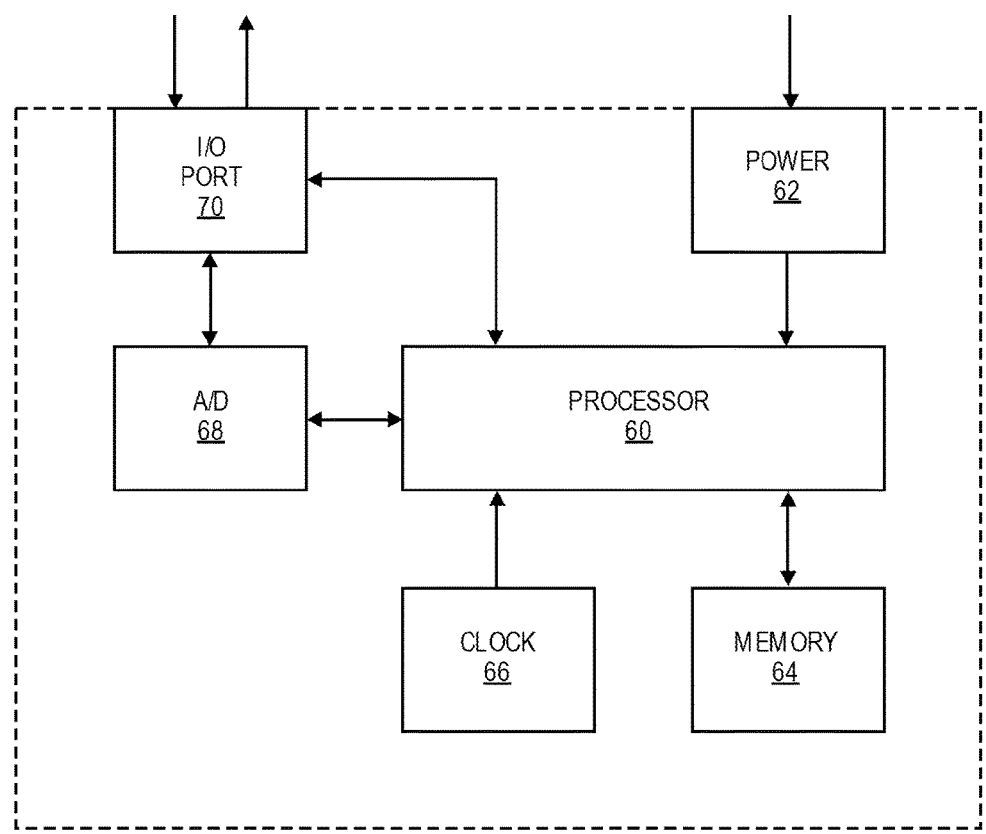
FIG. 3 is a block diagram of a computer suitable for use with the fund allocation management system according to FIG. 1.

FIG. 3 is a system architecture for the computer 30 suitable for use in the fund allocation management system 10 according to FIG. 2. As shown in FIG. 3, the computer 30 includes a processor 60. This processor 60 is operably connected to a power supply 62, a memory 64, a clock 66, an analog to digital converter (A/D) 68, an input/output (I/O) port 70, and the like. The I/O port 70 is configured to receive signals from any suitably attached electronic device and forward these signals to the ND 68 and/or the processor 60.

For example, the I/O port 70 may receive signals associated with customer input from the keypad, for example, and forward the signals to the processor 60. If the signals are in analog format, the signals may proceed via the ND 68. In this regard, the A/D 68 is configured to receive analog format signals and convert these signals into corresponding digital format signals. Conversely, the ND 68 is configured to receive digital format signals from the processor 60, convert these signals to analog format, and forward the analog signals to the I/O port 70. In this manner, electronic devices configured to receive analog signals may intercommunicate with the processor 60.

The processor 60 is configured to receive and transmit signals to and from the A/D 68 and/or the I/O port 70. The processor 60 is further configured to receive time signals from the clock 66. In addition, the processor 60 is configured to store and retrieve electronic data to and from the memory 64. Furthermore, the processor 60 is configured to access the financial management application 32 to determine steps to perform actions to manage the account 26. For example, based on financial management application 32, the processor 60 is configured to determine how to allocate funds in the account 26 based upon customer input, information from the utility 20, and/or based upon historical usage trends.

Figure 4:
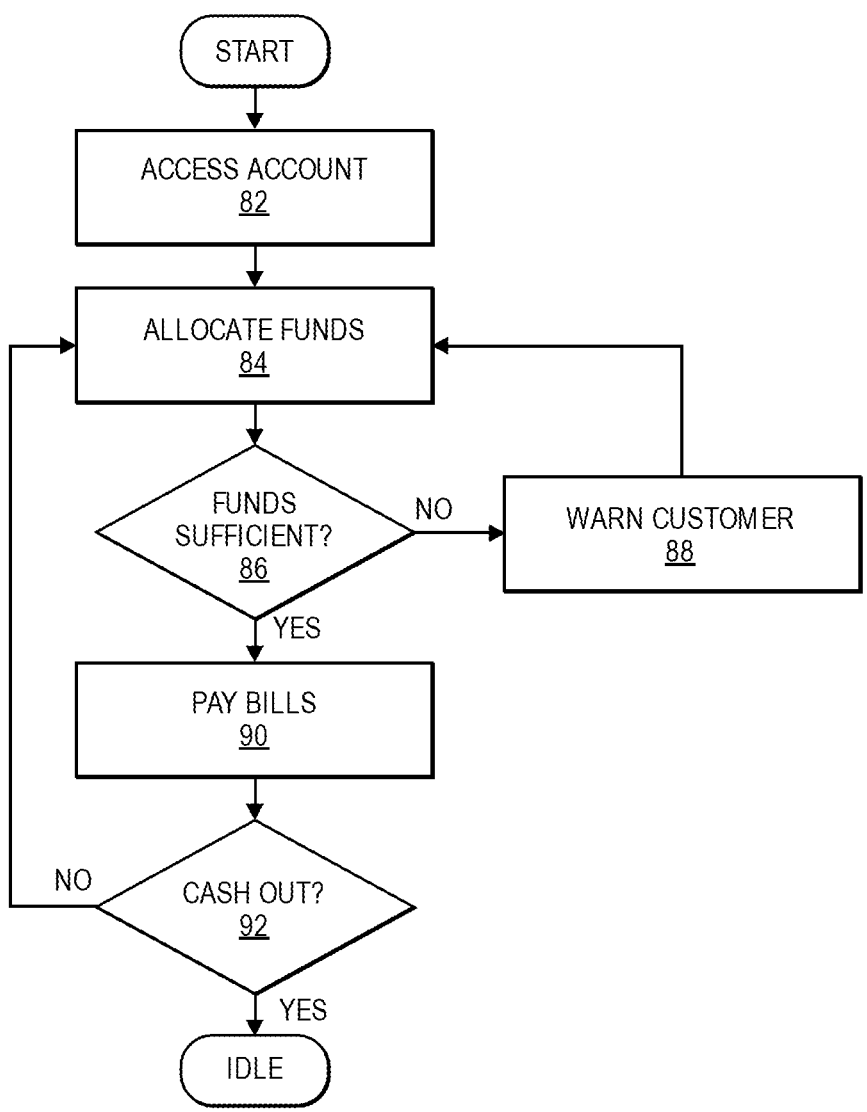
FIG. 4 is a flow diagram illustrating a method of managing an account according to an aspect of the invention.

FIG. 4 is a flow diagram of a method 80 according to an aspect of the invention. In the following description of the method 80, the various steps are presented in a particular order, however, it is to be known that the steps may be performed in any suitable order. As shown in FIG. 4, the method 80 is initiated in response to accessing the account 26 in the fund allocation management system 10 at step 82. Prior to initiation of the method 80, the customer may acquire the debit card 12, access to the account 26, and/or deposit funds in the account 26. Typically, the customer might establish a login identification and password. In addition, the customer may link the account 26 to a bill pay system for paying bills to the utility 20.

At step 84, the customer may utilize a user interface on the work station 16, wireless device 22, kiosk 28, or the like to create one or more reserves by allocating specific funds from the account 26. For example, a utility reserve may be created to pay the bills for the utility 20 from funds in the account 26. Optionally, other funds may be allocated to other reserves for other goods and/or services. Examples of other goods and services may include groceries, child care, loan repayment, child support, and the like. Optionally, the fund allocation management system 10 may calculate monthly expenses automatically based on input from the utility 20, historical payments, payments of comparable customers, and the like. Based on these calculations, the fund allocation management system 10 may automatically allocate funds to the appropriate reserve from the account 26. The fund allocation management system 10 may be configured to adjust based on the customer's behavior and/or account for seasonal changes (e.g. gas is typically more expensive during the winter and electricity generally costs more during the summer). Optionally, a reserve for a particular item and/or classes of items may be created and may have funds allocated to the reserve. For example, a reserve may be created from funds and these funds may be set aside for a television or other relatively expensive single item. In another example, a reserve may be created from funds allocated for diapers, food, clothing, and the like. In a particular example, the fund allocation management system 10 may automatically create a reserve and allocate funds for future events such as vacations or a "rainy day" fund. These automatic allocations may be made periodically or as extra funds become available. In response to these selected items or classes of items being purchased with the prepaid debit card or other financial instrument, the allocated funds may be automatically or manually withdrawn from the account 26.

Optionally, the fund allocation management system 10 may allocate the funds based on priority. For example, rent and utilities may be allocated in the highest priority. Charges for late payment or credit or other debt at a high interest rate or with high penalty fees may be allocated at the next highest priority. At a relatively lower priority, some remaining funds might be allocated to entertainment, a hobby, or the like.

Optionally, the fund allocation management system 10 may include two or more management or security levels. For example, some discretionary funds may be allocated to a first or low level of security and may be spent or re-allocated freely by the individual. However, at a second management or security level, a security code and/or authorization from a second user may be required to spend or re-allocate funds. For example, in order to spend funds allocated to paying the rent on something other than the rent, two account holders may be required to authorize the spending or re-allocation of those funds.

Optionally, the fund allocation management system 10 may bar funds from being used to purchase items from a specified point of sale and/or to purchase items in a specified category. For example, a parent or guardian may specify that funds cannot be withdrawn from the account to purchase items from a bar or liquor store. The fund allocation management system 10 optionally includes a password to protect funds so that selected funds may be locked into payment for selected bills and/or funds may be barred from being used to purchase specified items or from specified types of stores. In addition or alternatively, the fund allocation management system 10 may notify the user when spending money on discretionary items (e.g., eating out, movies, etc.) that these types of purchases should be limited. The fund allocation management system 10 may notify the user over a communication channel as defined herein. The fund allocation management system 10 may notify the user via SMS text message to an associated wireless device 22 of the user. The fund allocation management system 10 may notify the user via a message to the financial management application 32 executed on an associated wireless device 22 of the user.

At step 86, the fund allocation management system 10 may calculate if there are sufficient funds to pay some or all allocated funds. If not, the fund allocation management system 10 may inform the customer via the display 42 and/or wireless device 22. The fund allocation management system 10 optionally determines additional costs for late payments so that the customer can make an informed decision as to which bills to pay on time and, if need be, which can be late. In addition, the customer may be able to re-allocate funds at step 84 and/or deposit additional funds to cover all allocated funds. If sufficient funds are present in the account 26, the bills may be paid at step 90. Of note, the fund allocation management system 10 may optionally inform the customer regarding an amount of discretionary funds they have available based on their own settings and/or through automated algorithms that calculate monthly and/or other reoccurring expenses. Also of note, if the customer attempts to purchase an item that will draw down the account 26 below the amount needed to cover the allocated funds, the customer may be warned at step 88 and/or the purchase may be denied.

At step 92, the customer may decide whether to cash out the account 26 or maintain the account 26 to pay for future goods and/or services. For example, paying an allocated bill may deplete the balance on the account 26 and the customer may decide not to deposit additional funds in the account 26. In another example, the customer may purchase an item or withdraw cash that depletes the balance on the account 26. If the customer decides to maintain the account 26, funds may be automatically and/or manually allocated at step 84. In general, additional funds may be deposited into the account 26 at any time.

The fund allocation management system optionally includes a password to protect funds so that selected funds may be locked into payment for selected bills. In this manner, these preselected bills are paid and remaining funds may be calculated by subtracting the protected funds from the total funds. The customers may be provided with a tally of these remaining funds in order to determine how much discretionary funds they have at any given period.

Figure 5:
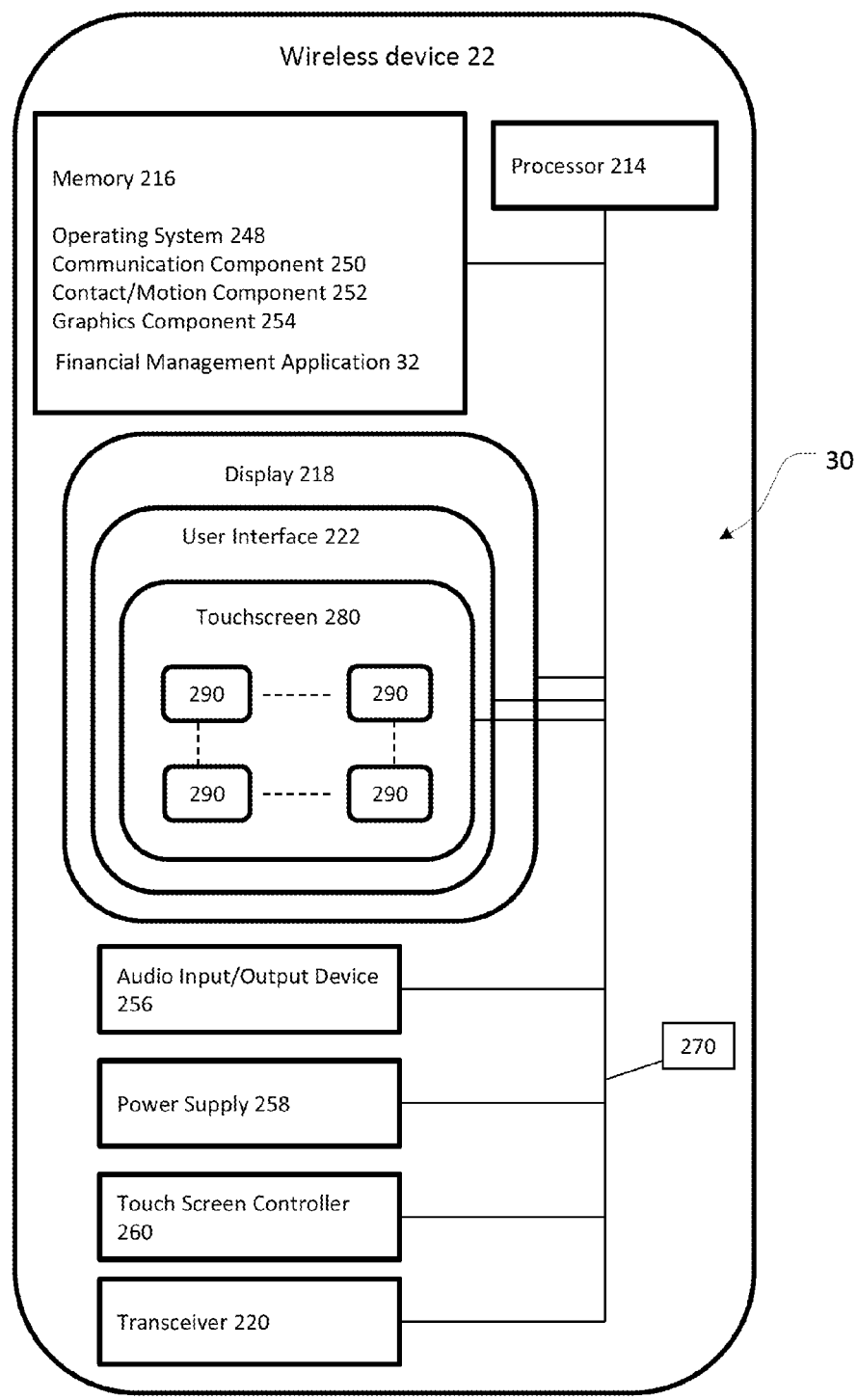
FIG. 5 illustrates an exemplary electronic device in accordance with an aspect of the invention.

FIG. 5 illustrates an exemplary wireless device 22, such as, for example, a mobile smart phone which may be employed in many aspects of this application. In an exemplary aspect, the wireless device 22 includes a processor 214, memory 216, display 218, a power supply 258 and a user interface 222.

The processor 214 may be a central processing unit configured to execute instructions, such as, for example, instructions related to software programs. Any processor can be used for the electronic device as understood to those of ordinary skill in the art. The display 218 may be a liquid crystal display (LCD). Preferably the LCD includes a backlight to illuminate the various color liquid crystals to provide a more colorful display. The user interface 222 may be any type of physical input as readily employed in the field. For example, the user interface may have physical buttons. Alternatively, the user interface may be implemented on a touchscreen 280 having a touchscreen controller 260.

The memory 216 of the wireless device 22 may further include an operating system 248, a communication component 250, a contact/motion component 252, a graphics component 254 and the like. The operating system 248 together with the various components provides software functionality for each of the components of the wireless device 22. The memory 216 may include a high-speed, random-access memory. Also, the memory 216 may be a non-volatile memory, such as magnetic fixed disk storage, flash memory, UICC, SIM card, or the like. These various components may be connected through various communication lines including a data bus 270.

Additionally, the wireless device 22 may include an audio input/output device 256. The audio input/output device 256 may include speakers, speaker outputs, and the like, providing sound output; and may include microphones, microphone inputs, and the like, for receiving sound inputs. The audio input/output device 256 may include an analog to digital converter and a digital to audio converter for audio input and output functions respectively.

When implemented as a smart phone, the wireless device 22 may include a transceiver 220. The wireless device 22 may provide radio and signal processing as needed to access a network for services over a communication channel as defined herein. The processor 214 may be configured to process call functions, data transfer, and the like and provide other services to the user.

In an exemplary aspect, the touchscreen 280 of the invention may be implemented in the display 218 and may detect a presence and location of a touch of a user within the display area. For example, touching the display 218 of the wireless device 22 with a finger or hand. The touchscreen 280 may also sense other passive objects, such as a stylus.

In operation, the display 218 may show various objects 290 associated with applications for execution by the processor 214. For example, a user may touch the display 218, particularly the touchscreen 280, to interact with the objects 290. That is, touching an object 290 may execute an application in the processor 214 associated with the object 290 that is stored in memory 216. Additionally or alternatively, touching an object 290 may open a menu of options to be selected by the user. The display 218 may include a plurality of objects 290 for the user to interact with. Moreover the display 218 may include a plurality of screens. The display 218 showing one screen at a time. The user may interact with the display 218 to move a screen into view on the display 218. Various objects 290 may be located in each of the screens.

The touchscreen 280 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display 218 is generally configured to display a graphical user interface (GUI) that provides an easy to use visual interface between a user of the wireless device 22 and the operating system or application(s) running on the wireless device 22. Generally, the GUI presents programs, files and operational options with graphical images. During operation, the user may select and activate various graphical images displayed on the display 218 in order to initiate functions and tasks associated therewith.

In another aspect of the invention, the memory 216 of a wireless device 22 includes a database for storing user information. The user information is exemplary, and may include further information as required by the service provider and may include information such as full name, address, date of birth, email address, contact number, debit card information, credit card information, and the like. In one aspect, the database may include security questions. In another aspect, the database may include user specified preferences.

In another aspect of the application, the memory 216 of a wireless device 22 includes the financial management application 32. This financial management application 32 allows the user to at least partially execute and/or interact with the process associated with FIG. 4.

Accordingly, as described herein the invention provides a system for managing bank accounts and/or debit cards and methods of managing the bank accounts and/or debit cards that is capable of overcoming many disadvantages.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an embodiment, the invention may be web-based. For example, a server may operate a web application to allow the invention to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

In an embodiment, the invention may be implemented in any type of mobile wireless devices that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for managing a financial account comprising:
  a fund allocation management system that includes a financial management processor, an input/output port, and a network connection configured to provide communication over a network;
  the financial management processor being configured to access the financial account over the network connection and determine a balance and financial transactions associated with the financial account;
  the financial management processor being further configured to determine an amount of at least one bill that is due in the future based on historical financial transactions associated with the at least one bill;
  the financial management processor being further configured to reserve and allocate funds from the financial account to ensure sufficient funds for payment of the at least one bill that is due in the future based on the historical financial transactions associated with the at least one bill;
  the financial management processor being further configured to determine available funds that remain after reserving and allocation of funds from the financial account to ensure sufficient funds for payment of the at least one bill that is due in the future;
  the financial management processor being further configured to communicate by transmission of a communication over the network via the network connection to a user wireless device, the communication providing the available funds for display on the user wireless device that remain after allocation of funds from the financial account to ensure sufficient funds for the at least one bill that is due in the future based on the historical financial transactions associated with the at least one bill; and
  the financial management processor further configured to prevent the allocated funds from being withdrawn from the financial account by the user,
  wherein the financial management processor communicates to the user wireless device via a mobile phone application implemented by a processor of the wireless device to provide the available funds for display on the user wireless device that remain after the allocation of funds; and
  wherein a display of the user wireless device displays the communication from the financial management processor via the mobile phone application implemented by the processor of the wireless device.

2. The system of claim 1
  wherein the financial management processor is further configured to receive from the user wireless device instructions to generate one or more reserves to allocate funds for the at least one bill that is due in the future; and
  wherein the financial management processor is further configured to prevent the allocated funds from being withdrawn from the financial account by the user for a purchase by denying the purchase.

3. The system of claim 1
  wherein the financial management processor is further configured to prevent the allocated funds from being withdrawn from the financial account by the user unless the user provides an override; and
  wherein the override comprises a password.

4. The system of claim 1
  wherein the financial account is associated with a debit card; and
  wherein the financial management processor is configured to determine a balance and financial transactions associated with the debit card.

5. The system of claim 1 wherein the financial management processor is a server.

6. The system of claim 1 wherein the financial management processor is further configured to allocate funds from the financial account to pay the at least one bill that is due in the future based on input from the user wireless device received over the network via the network connection.

7. The system of claim 1 wherein the financial management processor is further configured to allocate funds from the financial account to cover expenditures due in the future based on input received from the user wireless device received over the network via the network connection.

8. The system of claim 1 wherein the financial management processor is further configured to allocate funds from the financial account to pay the at least one bill that is due in the future based on one of the following: payments of comparable customers and an entity associated with the at least one bill.

9. The system of claim 1 wherein the financial management processor is further configured to allocate funds from the financial account to pay the at least one bill that is due in the future based on information provided by an entity associated with the at least one bill.

10. A process for managing a financial account comprising:
  implementing a fund allocation management system that includes a financial management processor, an input/output port, and a network connection configured to provide communication over a network;
  determining a balance and financial transactions associated with the financial account with the financial management processor configured to access the financial account over the network connection;

determining with the financial management processor an amount of at least one bill that is due in the future based on historical financial transactions associated with the at least one bill;

allocating and reserving funds from the financial account to ensure sufficient funds for payment of the at least one bill that is due in the future with the financial management processor based on the historical financial transactions associated with the at least one bill;

determining available funds that remain after reserving and allocation of funds from the financial account to ensure sufficient funds for payment of the at least one bill that is due in the future with the financial management processor;

communicating by transmission of a communication over the network via the network connection to a user wireless device, the communication providing available funds for display on the user wireless device that remain after allocation of funds from the financial account to ensure sufficient funds for the at least one bill that is due in the future with the financial management processor based on the historical financial transactions associated with the at least one bill;

preventing the allocated funds from being withdrawn from the financial account by a user with the financial management processor; and communicating to a user via a mobile phone application implemented by a processor of the wireless device with the financial management processor to provide the available funds for display on the user wireless device that remain after the allocation of funds, wherein a display of the user wireless device displays the communication from the financial management processor via the mobile phone application implemented by the processor of the wireless device.

11. The process of claim 10 further comprising preventing the allocated funds from being withdrawn from the financial account by the user for a purchase by denying the purchase with the financial management processor, wherein the financial management processor is further configured to receive from the user wireless device instructions to generate one or more reserves to allocate funds for the at least one bill that is due in the future.

12. The process of claim 10 further comprising preventing the allocated funds from being withdrawn from the financial account by a user unless the user provides an override with the financial management processor, wherein the override comprises a password.

13. The process of claim 10 wherein the financial account is associated with a debit card; and wherein the financial management processor is configured to determine a balance and financial transactions associated with the debit card.

14. The process of claim 10 wherein the financial management processor is a server.

15. The process of claim 10 further comprising allocating funds from the financial account to pay the at least one bill that is due in the future with the financial management processor based on input from the user wireless device received over the network via the network connection.

16. The process of claim 10 further comprising allocating funds from the financial account to cover expenditures due in the future with the financial management processor based on input received from the user wireless device received over the network via the network connection.

17. The process of claim 10 further comprising allocating funds from the financial account to pay the at least one bill that is due in the future with the financial management processor based on one of the following: payments of comparable customers and an entity associated with the at least one bill.

18. The process of claim 10 further comprising allocating funds from the financial account to pay the at least one bill that is due in the future based on information provided by an entity associated with the at least one bill with the financial management processor.

19. The system of claim 1 wherein the financial management processor is further configured to allocate funds from the financial account to create a reserve for future purchases in response to a user input.

20. The process of claim 10 further comprising allocating funds from the financial account to create a reserve for future purchases in response to a user input.

* * * * *